US008170194B2

(12) United States Patent
Shen et al.

(10) Patent No.: US 8,170,194 B2
(45) Date of Patent: *May 1, 2012

(54) METHOD AND SYSTEM FOR REPLICATING RING BACK TONES

(75) Inventors: Qingchun Shen, Shenzhen (CN); Hui Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 744 days.

This patent is subject to a terminal disclaimer.

(21) Appl. No.: 12/271,143

(22) Filed: Nov. 14, 2008

(65) Prior Publication Data

US 2009/0116632 A1    May 7, 2009

Related U.S. Application Data

(63) Continuation of application No. 12/172,794, filed on Jul. 14, 2008, now Pat. No. 7,471,783, which is a continuation of application No. PCT/CN2007/070292, filed on Jul. 13, 2007.

(30) Foreign Application Priority Data

Sep. 30, 2006    (CN) .......................... 2006 1 0140424

(51) Int. Cl.
*H04M 3/42*    (2006.01)
*H04B 1/38*    (2006.01)
(52) U.S. Cl. ................ 379/207.16; 348/14.01; 370/218; 370/230; 370/390; 379/88.17; 379/114.22; 379/201.02; 379/372; 379/418; 386/228; 455/414.1; 455/435.1; 455/517; 455/567; 709/223; 709/231; 726/5

(58) Field of Classification Search .................. 370/230, 370/390, 218; 379/88.17, 88.23, 114.22, 379/201.01, 201.02, 207.16, 257, 372, 418, 379/88.13, 88.16, 88.19, 114.01, 201.12, 379/211.01, 215.01, 217.01, 221.01, 221.08, 379/373.01, 399.01; 455/414.1, 435.1, 517, 455/567; 348/14.01; 386/228; 709/223, 709/231; 726/5
See application file for complete search history.

(56) References Cited

U.S. PATENT DOCUMENTS 5,127,004 A    6/1992    Lenihan et al.
(Continued)

FOREIGN PATENT DOCUMENTS

CN    1700713 A    11/2005
(Continued)

OTHER PUBLICATIONS

International Search Report from International Patent Application No. PCT/CN2007/070292.

(Continued)

*Primary Examiner* — Gerald Gauthier
(74) *Attorney, Agent, or Firm* — Leydig, Voit & Mayer, Ltd.

(57)    ABSTRACT

The present invention, in one aspect, relates to a method for replicating ring back tone (RBT). In one embodiment, the method includes the steps of sending a Play and Collect request to a media resource server (MRS) by an application server (AS), playing an RBT subscribed by the called party to the calling party and obtaining a Replicate RBT request initiated by the calling party according to the Play and Collect request by the MRS, receiving the Replicate RBT request obtained and sent by the MRS, by the AS, and sending a Replicate RBT command to an RBT platform according to the received Replicate RBT request by the AS, the Replicate RBT command carrying RBT replication information and instructing the RBT platform to replicate the requested RBT to an information library of the calling party. The invention also relates to a system and apparatus for implementing same.

18 Claims, 3 Drawing Sheets

U.S. PATENT DOCUMENTS

| | | | |
|---|---|---|---|
| 6,445,802 B1 | 9/2002 | Dan | |
| 6,577,718 B1* | 6/2003 | Kalmanek et al. | 379/114.22 |
| 6,618,600 B1 | 9/2003 | Chow et al. | |
| 6,643,507 B1 | 11/2003 | Chow et al. | |
| 6,711,401 B1 | 3/2004 | Chow et al. | |
| 7,058,429 B2 | 6/2006 | Fujito et al. | |
| 7,123,903 B2 | 10/2006 | Seki | |
| 7,136,679 B2* | 11/2006 | Beauford | 455/567 |
| 7,142,645 B2* | 11/2006 | Lowe | 379/88.16 |
| 7,151,772 B1* | 12/2006 | Kalmanek et al. | 370/390 |
| 7,174,009 B1* | 2/2007 | Zhang et al. | 379/221.01 |
| 7,248,900 B2* | 7/2007 | Deeds | 455/567 |
| 7,274,662 B1* | 9/2007 | Kalmanek et al. | 370/230 |
| 7,336,777 B2 | 2/2008 | Lee et al. | |
| 7,340,049 B2* | 3/2008 | Batni et al. | 379/221.08 |
| 7,471,783 B1* | 12/2008 | Shen et al. | 379/207.16 |
| 7,512,421 B2* | 3/2009 | Kim et al. | 455/567 |
| 7,623,642 B2* | 11/2009 | Izquierdo Gonzalez | 379/201.01 |
| 7,801,293 B2* | 9/2010 | Batni et al. | 379/207.16 |
| 7,839,995 B2* | 11/2010 | Batni et al. | 379/418 |
| 7,844,044 B2* | 11/2010 | Batni et al. | 379/257 |
| 7,995,728 B1* | 8/2011 | Martin et al. | 379/201.01 |
| 8,027,456 B1* | 9/2011 | Zhang et al. | 379/257 |
| 8,054,960 B1* | 11/2011 | Gunasekara | 379/201.12 |
| 8,059,800 B1* | 11/2011 | Martin et al. | 379/114.01 |
| 8,073,128 B2* | 12/2011 | Batni et al. | 379/257 |
| 8,081,751 B1* | 12/2011 | Martin et al. | 379/373.01 |
| 2003/0109251 A1 | 6/2003 | Fujito et al. | |
| 2004/0114732 A1* | 6/2004 | Choe et al. | 379/88.17 |
| 2005/0037793 A1* | 2/2005 | Urata et al. | 455/517 |
| 2005/0094796 A1* | 5/2005 | Beauford | 379/211.01 |
| 2005/0172154 A1* | 8/2005 | Short et al. | 713/201 |
| 2005/0185918 A1* | 8/2005 | Lowe | 386/46 |
| 2006/0098801 A1* | 5/2006 | Hahm et al. | 379/257 |
| 2006/0109970 A1* | 5/2006 | Shim et al. | 379/207.16 |
| 2006/0135158 A1* | 6/2006 | Lee et al. | 455/435.1 |
| 2006/0203985 A1* | 9/2006 | Beauford | 379/211.01 |
| 2006/0210033 A1* | 9/2006 | Grech et al. | 379/88.19 |
| 2006/0258405 A1* | 11/2006 | Gonzalez | 455/567 |
| 2007/0003047 A1* | 1/2007 | Batni et al. | 379/215.01 |
| 2007/0005747 A1* | 1/2007 | Batni et al. | 709/223 |
| 2007/0030338 A1* | 2/2007 | Jiang et al. | 348/14.01 |
| 2007/0116253 A1* | 5/2007 | Batni et al. | 379/399.01 |
| 2007/0121657 A1 | 5/2007 | Boillot et al. | |
| 2007/0123311 A1* | 5/2007 | Kim et al. | 455/567 |
| 2007/0173236 A1* | 7/2007 | Vishwanathan et al. | 455/414.1 |
| 2007/0207782 A1 | 9/2007 | Tran | |
| 2007/0263604 A1 | 11/2007 | Tai | |
| 2007/0286402 A1* | 12/2007 | Jacobson | 379/372 |
| 2007/0291931 A1 | 12/2007 | DeMent | |
| 2008/0063168 A1* | 3/2008 | Haley et al. | 379/201.01 |
| 2008/0096535 A1 | 4/2008 | Kim | |
| 2008/0165940 A1* | 7/2008 | Fiorillo et al. | 379/88.23 |
| 2009/0116632 A1* | 5/2009 | Shen et al. | 379/207.16 |

FOREIGN PATENT DOCUMENTS

| | | |
|---|---|---|
| CN | 1731802 A | 2/2006 |
| CN | 1832518 A | 9/2006 |
| CN | 1964396 B | 7/2011 |
| EP | 1494442 A2 | 1/2005 |
| EP | 1686781 A1 | 8/2006 |
| KR | 2003-0067613 A | 8/2003 |
| KR | 2006-0068155 A | 6/2006 |
| WO | 2005/051015 A1 | 6/2005 |
| WO | WO 2005/120028 A1 | 12/2005 |
| WO | WO 2006/001682 A2 | 1/2006 |
| WO | WO 2006/057504 A1 | 6/2006 |
| WO | WO 2006/063903 A1 | 6/2006 |
| WO | 2007/076885 A1 | 7/2007 |
| WO | WO 2007/142839 A2 | 12/2007 |
| WO | WO 2007/142853 A1 | 12/2007 |

OTHER PUBLICATIONS

2nd Office Action in corresponding Chinese Application No. 2006101404243 (Jun. 19, 2009).

3rd Office Action in corresponding Chinese Application No. 2006101404243 (Sep. 11, 2009).

4th Office Action in corresponding Chinese Application No. 2006101404243 (Dec. 18, 2009).

Office Action in corresponding U.S. Appl. No. 12/172,794 (Aug. 11, 2008).

Bildikar, "SIP Interface for Media Servers with BAU," IETF Sipping Working Group (Internet Draft), 1-11 (Dec. 2005) http://draft-darshan-sipping-bau-00.txt.

Image File Wrapper in corresponding U.S. Appl. No. 12/172,794 (Nov. 23, 2011).

Written Opinion of the International Searching Authority in corresponding PCT Application No. PCT/CN2007/070292 (Sep. 20, 2007).

Letter from the European Patent Office corresponding to European Application No. 07764220.5 (Oct. 18, 2011).

Extended European Search Report in corresponding European Application No. 07764220.5 (Jun. 19, 2009).

* cited by examiner

METHOD AND SYSTEM FOR REPLICATING RING BACK TONES

CROSS-REFERENCE TO RELATED PATENT APPLICATIONS

This patent application is a continuation of U.S. patent application Ser. No. 12/172,794, filed Jul. 14, 2008, which is a continuation of International Patent Application No. PCT/CN2007/070292, filed Jul. 13, 2007, which claims priority to Chinese Patent Application No. 200610140424.3, filed Sep. 30, 2006, all of which are hereby incorporated by reference in their entirety.

FIELD OF THE INVENTION

The present invention generally relates to a multimedia ring back tone (RBT) service, and more particularly, to a method for replicating a RBT subscribed by a called party to a calling party, and a system and apparatus of implementing same.

BACKGROUND OF THE INVENTION

With the development of networks, especially the advent of a next generation network (NGN) era, network bandwidth continues increasing with stronger capacity and richer functionality. With NGN, colorful RBTs, like songs, cartoons and movie clips, can be provided, satisfying the personalized requirements of users.

By requesting to activate the multimedia RBT service, a user can order these personalized RBTs and become an RBT subscriber. A multimedia RBT is a service subscribed by a called party, which provides a piece of music, a greeting, an image or a video clip as the RBT for a calling party, instead of the ordinary sound of "toot . . . toot . . . ". If a called party is a RBT subscriber, when calling the called party, a calling party will hear or see a personalized RBT subscribed by the called party. Taking the implementation based on the Session Initiation Protocol (SIP) in the NGN as an example, the following details the procedure in which the calling party calls the RBT subscriber and hears the RBT subscribed by the called party.

FIG. 1 shows a network system for playing RBTs to the calling party in the NGN. The system includes a network and a calling party. The network includes a softswitch, a smart home location register (SHLR), an application server (AS), a media resource server (MRS), a File Transfer Protocol (FTP) server, an RBT platform and a database of the RBT platform. The calling party includes a calling party and a called party. The called party is a RBT subscriber.

The softswitch is core equipment at the network control layer in the NGN. In addition to rich fixed-line telecom services and supplementary services, the softswitch provides the calling party with diversified and value-added services by interacting with various application servers. The SHLR is a comprehensive central subscriber database that stores logical numbers, physical numbers and their mapping as well as intelligent network (IN) service attributes of subscribers.

The AS provides a service execution environment and value added services for networks accessing the NGN. The MRS provides feature resources for the AS to implement the interaction with subscribers, thus realizing service functions and playing of RBTs. The FTP server with a large capacity is adapted for storing a large amount of voice and video files. If there are few voice and video files, the FTP server may not be required.

The RBT platform is adapted for providing uniform interfaces for RBT data management and operation management. The RBT platform database stores RBT related information.

The procedure for playing the RBT to a calling party based on the system is shown in FIG. 2.

FIG. 2 shows the flowchart of playing the RBT to the calling party. The calling party sends a request to the AS via the softswitch. The AS sends the called number to the softswitch upon reception of the call request. The softswitch routes the call to the called party. If the called party is connected, it sends an Alert message to the AS via the softswitch. Upon reception of the Alert message, the AS queries the RBT subscribed by the called party in the database of the RBT platform and sends a Play RBT message to the MRS. The MRS obtains the RBT file, sets up a media channel with the calling party, and plays the RBT to the calling party. After the called party answers the call and notifies the AS, the AS sends a SIP BYE message to the MRS. The MRS stops playing the RBT. The calling party and the called party perform media negotiation and start normal communication.

If the calling party is also the RBT subscriber, when the calling party hears a favorite RBT and wants to order it, the calling party can only search and download it from the network. It may happen from time to time that the calling party does not know the name of the RBT or that the calling party knows the name but does not know how to download the RBT. This makes it impossible for the calling party to obtain the RBT of the called party instantly when the calling party listens to the RBT.

Therefore, a heretofore unaddressed need exists in the art to address the aforementioned deficiencies and inadequacies.

SUMMARY OF THE INVENTION

The objectives of the present application are to provide a method, system and apparatus for replicating an RBT, which enables a calling party to obtain a favorite RBT when it is being played to the calling party.

In one aspect, the present application relates to a method for replicating an RBT, in which the MRS plays an RBT to the calling party and obtains the Replicate RBT request inputted by the calling party. The method in one embodiment includes the steps of: receiving, by an AS, the Replicate RBT request obtained and sent by the MRS; and sending, by the AS, according to the Replicate RBT request, to the RBT platform a Replicate RBT command that carries RBT replication information, the Replicate RBT command instructs the RBT platform to replicate the requested RBT to an information library of the calling party.

In another aspect, the present application relates to a system for replicating an RBT. In one embodiment, the system includes an MRS, adapted for obtaining the Replicate RBT request inputted by a calling party when playing an RBT to the calling party, and forward the Replicate RBT request to an AS; an AS, adapted for sending a Replicate RBT command that carries RBT replication information to an RBT platform according to the Replicate RBT request forwarded by the MRS; and an RBT platform, adapted for receiving the Replicate RBT command from the AS and replicate the requested RBT to an information library of the calling party according to the Replicate RBT command.

In other aspect, the present application relates to an AS for replicating an RBT, the AS includes a component adapted for sending a Play and Collect request to an MRS, receiving the Replicate RBT request from the MRS, sending a Replicate RBT command to an RBT platform according to the received Replicate RBT request, the Replicate RBT command carrying RBT replication information and instructing the RBT platform to replicate the requested RBT to an information library of the calling party.

In other aspect, the present application relates to a MRS for replicating an RBT. The MRS includes a service processing unit and the play/collect unit. The service processing unit is adapted for receiving a Play and Collect request from an AS, sending a control command to a play/collect unit according to the Play and Collect request, receiving a Replicate RBT request of a calling party returned by the play/collect unit, and forwarding the Replicate RBT request to the AS. The play/collect unit is adapted for receiving the control command from the service processing unit and playing an requested RBT to the calling party according to the control command, and obtaining the Replicate RBT request inputted by the calling party and forward the Replicate RBT request to the service processing unit.

In operation, when the MRS plays an RBT to the calling party, if it obtains a Replicate RBT request inputted by the calling party, the MRS forwards the request to the AS. The AS sends a Replicate RBT command that carries RBT replication information to the RBT platform. The RBT platform replicates the requested RBT to the information library of the calling party according to the received command. This enables the calling party to obtain an RBT immediately when it is being played to the calling party.

These and other aspects of the present invention will become apparent from the following description of the preferred embodiment taken in conjunction with the following drawings, although variations and modifications therein may be affected without departing from the spirit and scope of the novel concepts of the present application.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
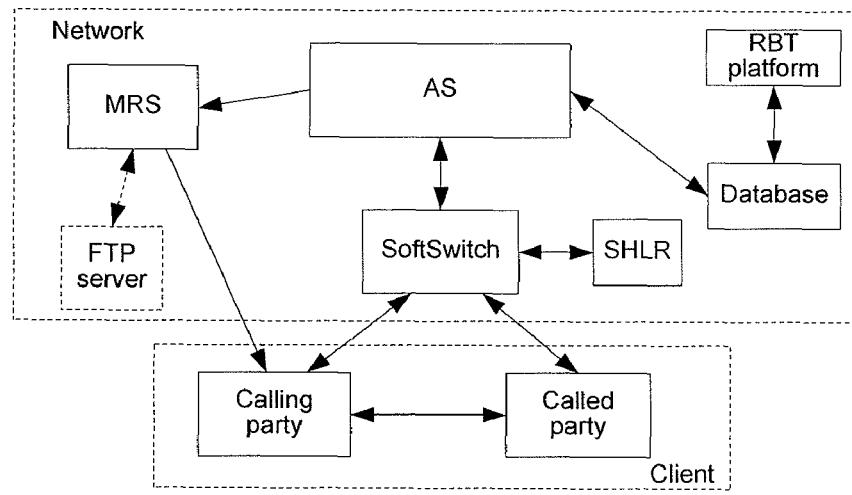
FIG. 1 shows schematically a network system for playing a RBT to a calling party in the NGN.
Figure 2:
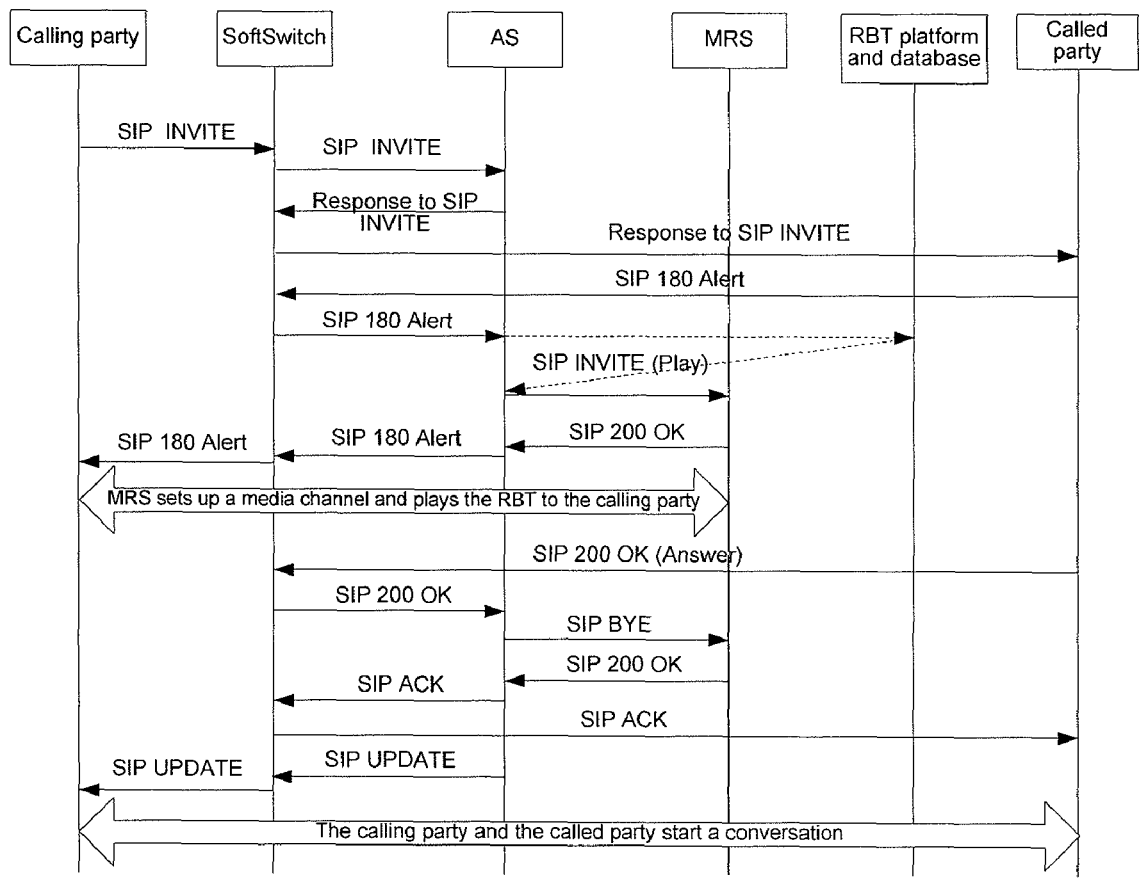
FIG. 2 shows a flowchart of playing a RBT to a calling party.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings of FIGS. 3-5. In accordance with the purposes of this invention, as embodied and broadly described herein, this invention, in one aspect, relates to method for replicating a ring back tone (RBT) subscribed by a called party to a calling party, and a system of implementing same.

In one embodiment of the present application, the MRS plays an RBT to the calling party, obtains the Replicate RBT request inputted by the calling party and forwards the Replicate RBT request to the AS. The AS then sends the Replicate RBT command to the RBT platform according to the received request. Accordingly, the RBT platform replicates the requested RBT to the information library of the calling party according to the received command. The calling party is normally a calling RBT subscriber.

According to the embodiment of the present application, digit collection simultaneously with RBT playing and non-interruptible RBT playing during digit collection is implemented by extending the interface protocol between the AS and the MRS and the interface protocol between the MRS and the calling party. Accordingly, the AS sends a Play and Collect request to the MRS. The MRS recognizes the request and plays the RBT to the calling party, obtains the Replicate RBT request inputted by the calling party, completes digit collection and plays the RBT uninterruptedly. The embodiment of the present application leverages appropriate parameters defined in a Basic Audio Unit (BAU) specifications to extend the interface between the AS and the MRS, so that the AS sends the Play and Collect request and the MRS recognizes the request. The embodiment also extends the functions of the play interface and the collect interface of the MRS. When the collect interface collects digits, the play interface sends media streams continuously, that is, playing the RBT uninterruptedly. So, when the MRS receives the Play and Collect request, the MRS collect digits and at the same time, continue playing the RBT without interruption.

The method and system for replicating RBTs will be detailed with reference to the accompany drawings. In the embodiment of the present application, the interface between the AS and the MRS is extended by carrying BAU event packages in SIP messages in the NGN, and the play and collect interfaces of the MRS are pre-extended, so that when the collect interface collects digits, the play interface plays the RBT uninterruptedly.

Figure 3:
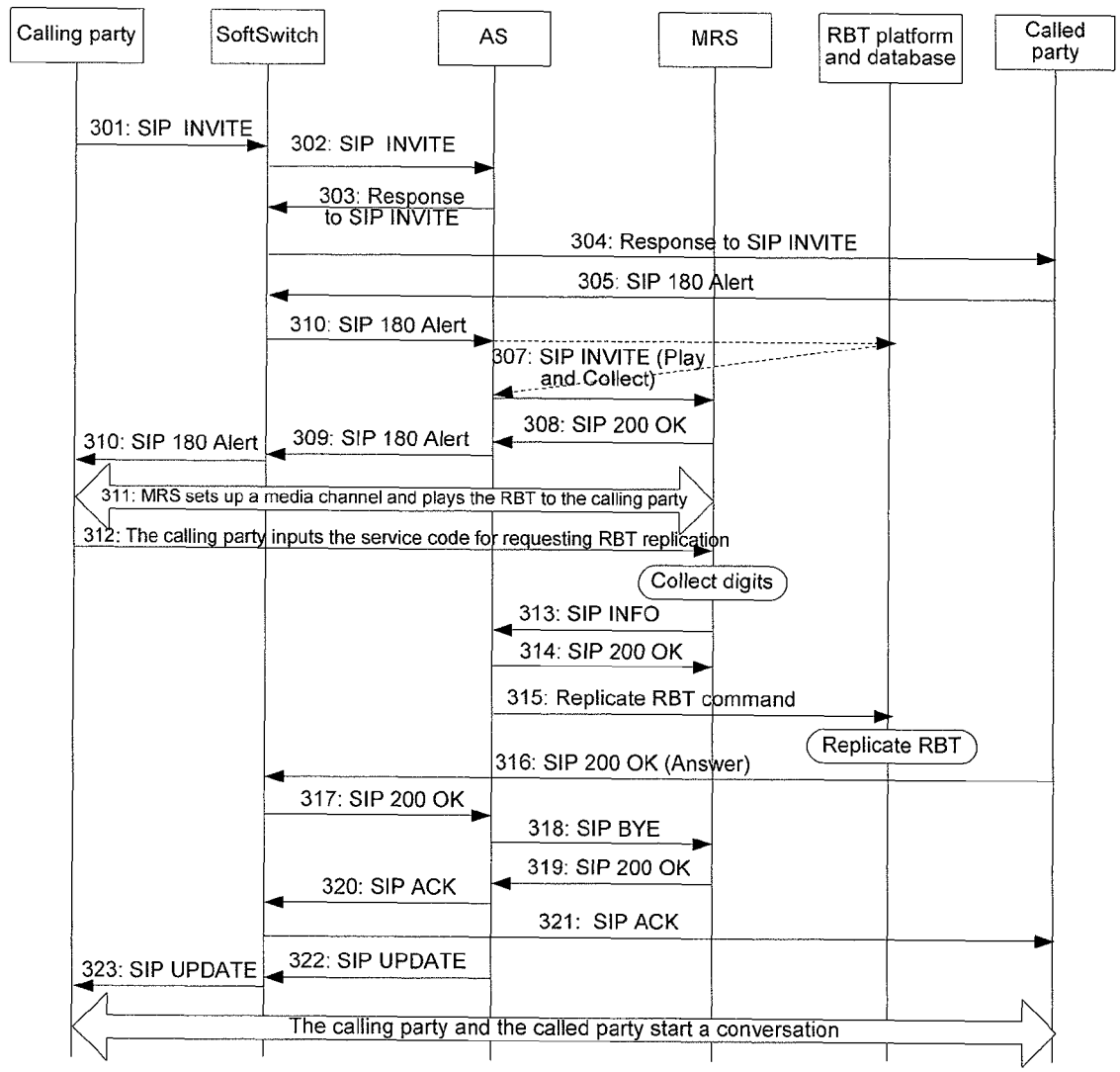
FIG. 3 shows a flowchart of playing the RBT to a calling RBT subscriber and replicating the RBT according to one embodiment of the present application.

FIG. 3 shows the flowchart of playing and replicating the RBT when one RBT subscriber calls another RBT subscriber according to one embodiment of the present application. For purposes of description, a calling RBT subscriber is hereinafter referred to as a calling party, a called RBT subscriber referred to as a called party, and both referred to as a client. As shown in FIG. 3, the method includes the following steps:

In step 301, a calling party sends a SIP INVITE message to a softswitch, requesting a call connection to a called party.

In step 302, the softswitch determines if the called party is the RBT subscriber via the SHLR, inserts an RBT flag to the SIP INVITE message, and forwards the SIP INVITE that carries the RBT flag to the AS.

In steps 303-304, upon reception of the SIP INVITE message, the AS authenticates the called party and sends the called number to the softswitch via the SIP INVITE message after successful authentication; the softswitch routes the call to the called party and connects the called party via the SIP INVITE message.

In steps 305-306, if the called party is connected, the called party sends a SIP 180 Alert message to the softswitch and the softswitch forwards the SIP 180 Alert message to the AS.

In step 307, upon reception of the SIP 180 Alert message, the AS determines that the called party is the RBT subscriber according to the SIP INVITE message received in In step 303 which carries an RBT flag, and queries the database of the RBT platform to obtain the RBT ordered by the called party; after the AS obtains the RBT code and resolves the path, the AS sends the SIP INVITE message, which carries the calling party information and the RBT information of the called party, requesting the MRS to play the RBT to the calling party and collect digits from the calling party.

In this step, to implement RBT replication, the SIP uniform resource location (URL) is adopted for addressing and BAU event packages are used to carry related information. The BAU event package includes three sub-events: Play Announcement (PA), Play and Collect (PC), and Play and Record (PR). The embodiment of the present application uses the PC event, which supports parameters Initial Prompt (ip), Non Interruptible Play (ni), and Digit Map (dm), but does not support Iterations (it) and Interval (iv).

The ip parameter specifies an announcement file, that is, an RBT announcement file.

The ni parameter indicates whether the playing may be interrupted and has a value of true or false. If the value is true, the playing is not interruptible; if the value is false, the playing may be interrupted.

The it parameter indicates the maximum number of playing iterations.

The iv parameter indicates the silence time between playing iterations.

The dm parameter indicates the digit map of valid keys and has a valid value including 0-9, # and *. If dm is set to 91, the valid keys are 9 and 1; if dm is set to 25, the valid keys are 2 and 5, and so on.

The RBT is non interruptible before the called party answers; otherwise, it loses the function as a telephone ring back tone. Therefore, to implement digit collection simultaneously with RBT playing, the RBT plays uninterruptedly during digit collection. In the prior art, this requirement is not considered, so specifications are not defined in this aspect. In the embodiment of the present application, to implement digit collection simultaneously with RBT playing and non interruptible RBT playing during digit collection, interface extensions are necessary. The PC sub-event in the BAU event package is extended to support parameters it and iv and the extended PC sub-event supports non interruptible RBT playing during digit collection. Through proper definitions, the AS and MRS use and recognize extended PC sub-events.

Below is an exemplary SIM INVITE message that carries an extended PC sub-event based on the preceding idea of interface protocol extension.

In the SIP protocol, the format of a SIP request message is:
Request=Request start line
  * (general header|request header|entity header)
  Empty line
  [Message body]

The request start line="Method Requested URI SIP Version", in which, Method indicates the type of message to be executed, such as INVITE and BYE, Requested URI is the current address of the invited subscriber and SIP Version is currently SIP/2.0. * indicates that there may be one or more such fields.

The embodiment supposes that the voice file is file://welcome and dm is 91, as the valid key values for subscriber input. For example, after the called party is alerted, the calling party begins to listen to the RBT defined by file://welcome, and the calling party can input digits during RBT playing, with 9 and 1 as the valid digits. Suppose in the Play RBT message sent to the MRS, the extended PC sub-event of BAU is set as follows: it=10, iv=10, ni=true, and suppose that the current address of the calling party is 182.20.60.2.

According to the above format, the request start line of the SIP INVITE carrying the extended PC sub-event of the BAU event package is as follows:
  INVITE SIP: anni. BAU. pc; ip=file://welcome; dm=91; it=10; iv=10; ni=true; @182.20.60.2 SIP/2.0.

In the prior art, a Play RBT request carries a PA sub-event. The calling party is not allowed to input digits during RBT playing. For example, using the above parameter values, the format of the request start line in the PA-based signaling flow shown in FIG. 1 may be, INVITE SIP: anni. BAU. pa; an=file://welcome; it=10; iv=10; @182.20.60.2 SIP/2.0.

In the embodiment of the present application, the entity part of the SIP INVITE message may be the same as that in the prior art. Specific settings of the parameters vary with the actual situation. The above only provides an exemplary format description.

In this step, the AS stores the current calling party information, called party information and the RBT information of the called party, specifically, the calling number, the called number and the RBT code of the called party.

In step 308, in response to the SIP INVITE message, the MRS sends a SIP 200 OK message to the AS.

In steps 309-310, the AS sends the SIP 180 Alert message to the softswitch and the softswitch forwards the message to the calling party. The message carries the MRS media information.

In step 311, the MRS obtains the RBT voice file according to the received SIP INVITE message, sets up a media channel with the calling party, plays the RBT to the calling party via the extended play interface, and sets up a digit collection channel.

In this step, the MRS recognizes and parses the received SIP INVITE message according to the preset interface protocol. If the voice file is placed on the FTP server, the MRS obtains the RBT voice file from the FTP server, or else the MRS obtains the voice file directly from its own storage. Normally, the FTP server is used because it has a large capacity, which is suitable for storage of voice files. In addition, the use of the FTP server facilitates the upload of voice files. Afterwards, the MRS plays the RBT via the play interface. If the calling party supports video playing and the called party has ordered an audio and video (AV) RBT, the MRS can also play the AV file to the calling party. If the calling party supports only audio, the MRS plays an audio RBT to the calling party. At the same time, the MRS sets up a digit collection channel with the calling party.

In step 312, if the calling party wishes to replicate the RBT currently played, the calling party inputs a preset service code for requesting RBT replication, that is, sending the Replicate RBT request to the MRS. For instance, if dm is set to 91, within the valid range of keys, the service code for requesting RBT replication can be preset to 99.

In step 313, the MRS receives the Replicate RBT request from the calling party, sends the request to the AS via an INFO message, and completes digit collection.

In this step, because the interface protocol of the MRS is pre-extended, the RBT is played uninterruptedly during and after digit collection. When the collect interface receives the Replicate RBT request from the calling party, the play interface continues sending media streams to the calling party, that is, the RBT is played uninterruptedly.

In step 312, when the calling party inputs the service code for requesting RBT replication via a telephone, the calling party sends a dual-tone multi-frequency (DTMF) signal, which can be forwarded by a media gateway (MG). The MG may forward the DTMF signal transparently to the MRS, or convert the DTMF signal into a Real-Time Transport Protocol (RTP) or Real-Time Transport Control Protocol (RTCP) media stream and send the media stream to the MRS. Thus, the MRS receives the Replicate RBT request from the calling party. The Replicate RBT request may be in form of a DTMF signal, an RTP media stream, or an RTCP media stream. Then the MRS resolves the received media stream or DTMF signal to obtain the Replicate RBT request inputted by the calling party and sends the request to the AS via the INFO message.

In steps 314-315, the AS sends the SIP 200 OK message in response to the INFO message. The AS recognizes the Replicate RBT request in the received INFO message and sends the Replicate RBT command that carries the RBT replication information to the RBT platform. The RBT platform receives the Replicate RBT command and replicates the requested RBT to the information library of the calling party (replicate the requested RBT code and download it into the personal RBT library of the calling party), according to the RBT replication information in the command, including the requested RBT code, the calling number and the called number.

The requested RBT is also the RBT of the called party that the calling party hears.

The Replicate RBT command sent by the AS to the RBT platform may be a Socket message based on the Transport Control Protocol/Internet Protocol (TCP/IP), or a command based on a stored procedure, or a command based on the Simple Object Access Protocol (SOAP). The specific adoption depends on the interface restraints of the RBT platform.

In step 316, the called party answers and sends to the softswitch the SIP 200 OK message that carries the called party information.

In steps 317-319, the softswitch forwards the SIP 200 OK message that carries called party information to the AS. The AS sends the SIP BYE message to the MRS upon reception of the SIP 200 OK. The MRS stops playing the RBT and sends to the AS the SIP 200 OK message indicating the end of playing in response to the SIP BYE message.

In steps 320-321, the AS sends a SIP ACK to the softswitch and the softswitch sends the SIP ACK to the called party.

In steps 322-323, when sending the SIP BYE to the MRS, the AS sends to the softswitch a SIP UPDATE message that carries the called number SDP. The softswitch forwards the SIP UPDATE to the calling party, requesting change of the calling party SDP, so that the calling party and the called party perform media negotiation and have a normal conversation.

In the above steps, steps 301-306 represent the signaling flow from when the calling party initiates a call attempt to the called party to when the AS returns the Alert message; steps 308-310 are the flow from when the MRS sends a response to the AS, when the AS sends the Alert message of the called party to the calling party upon reception of the response; steps 316-323 are from when the called party answers to when the calling party and the called party start a conversation. These steps are known and are described herein for illustrate one embodiment of the present application. However, the step 307 and steps 311-315 are inventive steps of the present application. The steps 313-315 and step 316, as set forth above, are not necessarily to be performed in sequence with step 316 Neither the process is the only way to practice the present invention.

Figure 4:
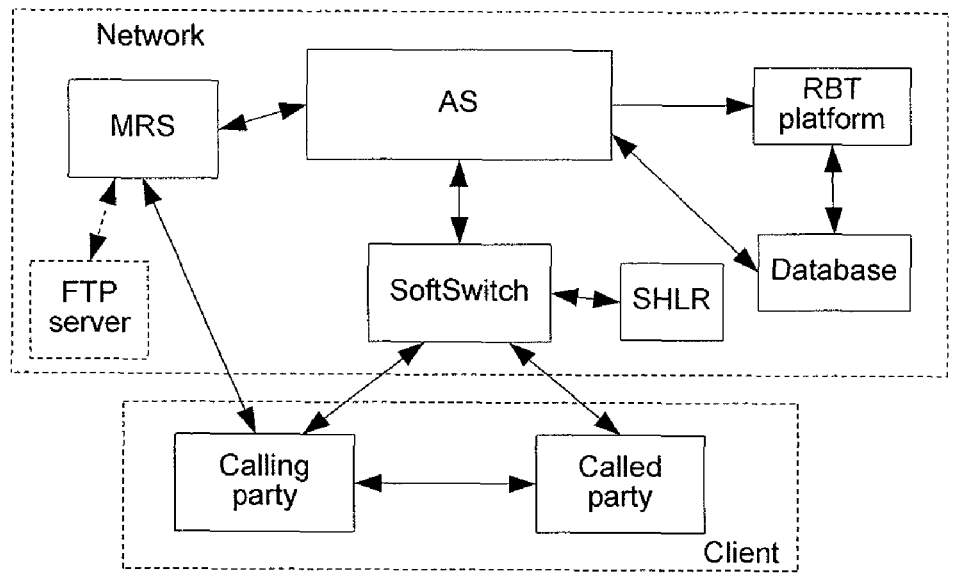
FIG. 4 shows schematically a system for playing the RBT to a calling RBT subscriber and replicating the RBT according to one embodiment of the present application.

FIG. 4 shows a schematic diagram of the system for replicating RBTs based on the method shown in FIG. 3 according to the embodiment of the present application.

In FIG. 4, the system includes a network and a client. The network includes a softswitch, the AS, the MRS, the RBT platform, and the database of the RBT platform. The client includes the calling RBT subscriber and the called RBT subscriber, referred respectively to as the calling party and the called party hereinafter.

The softswitch receives the call request from the calling party that carries the called number as the destination address, and after recognizing the called party as the RBT subscriber via the SHLR, inserts the RBT flag in the request message and sends the request carrying the RBT flag to the AS; the softswitch receives the call request that carries the called number returned by the AS and routes the call to the called party according to the message; the softswitch receives the Alert message returned by the called party and sends the Alert message to the AS.

The AS receives the call request that carries the RBT flag from the softswitch, authenticates the called party and sends the call request message that carries the called number to the softswitch after successful authentication; the AS receives the Alert message of the called party from the softswitch and according to the Alert message, obtains the RBT code from the database of the RBT platform, resolves the path and sends the Play and Collect message to the MRS; the AS receives the Replicate RBT request from the calling party forwarded by the MRS, recognizes that the calling party intends to replicate the RBT, and sends the Replicate RBT command that carries RBT replication information to the RBT platform according to the replication request; after the called party answers the call and notifies the AS, the AS sends the SIP BYE message to the MRS to stop playing the RBT; after receiving a response message indicating the end of playing from the MRS, the AS sends the media update message to the calling party, so that the calling party and the called party can perform media negotiation and have a normal conversation.

The database of the RBT platform receives the message from the AS, requesting the RBT code, and returns the requested RBT code to the AS.

The RBT platform receives the Replicate RBT command from the AS, and replicates the requested RBT to the information library of the calling party (replicate the requested RBT code to the personal RBT library of the calling party), according to the RBT replication information in the command.

The MRS receives the Play and Collect request from the AS, obtains the RBT voice file according to the message and sets up a media connection with the calling party to play the RBT to the calling party; the MRS obtains the Replicate RBT request inputted by the calling party and forwards the received Replicate RBT request to the AS; the MRS receives the SIP BYE message from the AS and stops playing the RBT to the calling party accordingly.

The system may further include the FTP server with a large capacity, adapted for storing voice and video files for the MRS to invoke. When the MRS receives the Play and Collect request from the AS, the MRS obtains the requested RBT voice file from the FTP server.

In the preceding embodiment of the invention, if the calling party is a non-RBT subscriber, when the calling party inputs the service code for requesting RBT replication, the above implementation flow is not affected but the RBT platform will give up replication when it fails to find an information library of the calling party.

In addition, according to the embodiment of the present application, the AS includes an application processing unit, adapted for sending the Play and Collect request to the MRS and receive the Play request inputted by the calling party and forwarded by the MRS, recognize the replication request in the Play request and send the Replicate RBT command that carries RBT replication information to the RBT platform.

Figure 5:
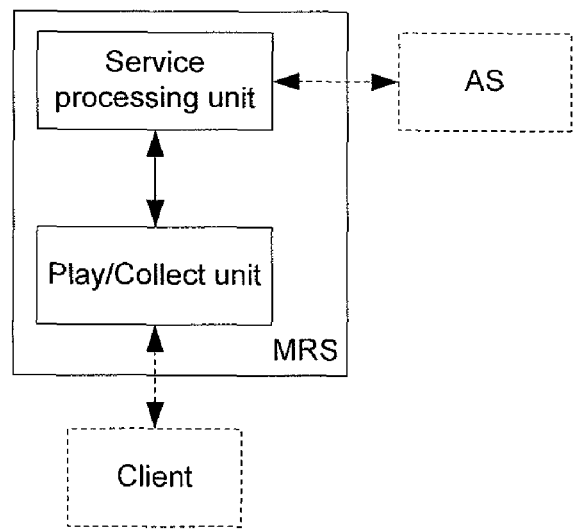
FIG. 5 shows schematically a structure of the MRS according to one embodiment of the present application.

In another embodiment of the present application, the MRS includes a play/collect unit and a service processing unit, which are schematically shown in FIG. 5.

The service processing unit receives the Play and Collect request from the AS and sends a control command to the play/collect unit according to the request; it receives the Replicate RBT request of the calling party returned by the play/collect unit and forwards the request to the AS.

The play/collect unit receives the control command from the service processing unit and plays the RBT to the calling party according to the command; it obtains the Replicate RBT request from the calling party and forwards the request to the service processing unit.

For the system and apparatus in the embodiments of the present application, the implementation flow is the same as that shown in FIG. 3.

In addition, those skilled in the art may make various variations to the MRS or AS according to the technical solution provided by the embodiments of the invention without any creative work, for instance, they can split or combine the units of the MRS or AS.

In the embodiments of the present application, when the MRS plays the RBT to a calling party, if it obtains the Replicate RBT request inputted by the calling party, the MRS forwards the request to the AS; the AS sends the Replicate RBT command that carries RBT replication information to the RBT platform; the RBT platform replicates the requested RBT to the information library of the calling party according to the received command. This enables the calling party to obtain an RBT immediately when the RBT is played to the calling party.

In addition, as RBT replication is implemented simultaneously when the calling party listens to an RBT, the calling party is free from the tedious work of network search and download. This further reduces the workload of the calling party and improves subscriber experience.

Finally, because the calling party obtains a favorite RBT while listening to an RBT, it is unnecessary for the calling party to know the RBT information, like the RBT name. This avoids the defect that the calling party is unable to search when the RBT information is unknown.

The above embodiments of the present application only take SIP-based messages as an example to describe the purpose, technical solution and benefits of the present application in detail. In practice, the embodiments of present application may also be applied to other protocols or network devices, such as the Intelligent Network Application Part (INAP) protocol and network devices based on the advanced intelligent peripheral (AIP).

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated.

Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for replicating a ring back tone (RBT) subscribed by a called party to a calling party over a network system, wherein the network system has an application server (AS), a media resource server (MRS), an RBT platform in communication with each other, comprising:
    receiving a call to a called party initiated by a calling party, by the AS;
    sending a Play and Collect request to the MRS, by the AS, wherein the MRS is adapted to play an RBT subscribed by the called party to the calling party and obtain a Replicate RBT request initiated by the calling party according to the received Play and Collect request;
    receiving the Replicate RBT request from the MRS, by the AS; and
    sending a Replicate RBT command to an RBT platform by the AS according to the received Replicate RBT request, the Replicate RBT command carrying RBT replication information and instructing the RBT platform to replicate the requested RBT to an information library of the calling party.

2. The method according to claim 1, wherein the Play and Collect request comprises a message that carries an extended Play and Collect sub-event package of a Basic Audio Unit (BAU) event package.

3. The method according to claim 2, wherein the extended Play and Collect sub-event package comprises parameters including Initial Prompt (ip), Non Interruptible Play (ni), Digit Map (dm) indicating valid key values, Iterations (it) and Interval (iv).

4. The method according to claim 1, wherein the obtaining the Replicate RBT request initiated by the calling party comprises:
    sending the Replicate RBT request in the form of a dual-tone multi-frequency (DTMF) signal to a media gateway (MG); and
    sending the received DTMF signal to the MRS transparently, or converting the received DTMF signal into a Real-Time Transport Protocol (RTP) media stream or a Real-Time Transport Control Protocol (RTCP) media stream and sending the converted media stream to the MRS, by the MG.

5. The method according to claim 4, wherein a service code for requesting RBT replication is preset according to the dm parameter that indicates valid key values.

6. The method according to claim 1, wherein the Replicate RBT command comprises a Socket message based on the Transport Control Protocol/Internet Protocol (TCP/IP), or a command based on a stored procedure, or a command based on the Simple Object Access Protocol (SOAP).

7. The method according to claim 1, wherein the RBT replication information comprises an RBT code and information of the calling party and the called party.

8. The method according to claim 7, wherein the RBT code is a code associated with the RBT played by the MRS to the calling party, and wherein the requested RBT is an RBT corresponding to the RBT code.

9. A system for replicating a ring back tones (RBT), comprising:
    an application service (AS) in communication with the RBT platform; and a media resource server (MRS) in communication with the AS, wherein the AS and the MRS are configured such that after receiving a call to a called party initiated by a calling party, the AS sends a Play and Collect request to the MRS;

the MRS plays an RBT subscribed by the called party to the calling party according to the received Play and Collect request, obtains a Replicate RBT request initiated by the calling party when playing the RBT to the calling party, and forwards the Replicate RBT request to the AS; and the AS sends a Replicate RBT command that carries RBT replication information to the RBT platform according to the Replicate RBT request forwarded by the MRS, so as to instruct the RBT platform to replicate the requested RBT to an information library of the calling party.

10. The system according to claim 9, wherein the AS comprises an application processing unit adapted for sending the Play and Collect request to the MRS, receiving the Replicate RBT request initiated by the calling party and forwarded by the MRS, and sending to the RBT platform the Replicate RBT command that carries RBT replication information.

11. The system according to claim 9, wherein the MRS comprises:

a service processing unit and a play/collect unit, wherein the service processing unit is adapted for receiving the Play and Collect request from the AS, sending a control command to the play/collect unit according to the Play and Collect request, receiving the Replicate RBT request of the calling party returned by the play/collect unit and forwarding the Replicate RBT request to the AS; and wherein the play/collect unit is adapted for receiving the control command from the service processing unit and playing the requested RBT to the calling party according to the control command, obtaining the Replicate RBT request from the calling party, and forwarding the Replicate RBT request to the service processing unit.

12. The system according to claim 11, wherein the MRS further comprises a play interface and a collect interface that are functionally extended such that when the collect interface collects information, the play interface sends media streams continuously, thereby playing the RBT uninterruptedly.

13. The system according to claim 9, further comprising:
a first interface protocol between the AS and the MRS; and
a second interface protocol between the MRS and the calling party,
wherein the first interface protocol and the second interface protocol are extended by leveraging parameters defined in Basic Audio Unit (BAU) specifications such that when the AS sends the Play and Collect request to the MRS, the MRS receives and recognizes the Play and Collect request.

14. The system according to claim 13, wherein the Play and Collect request comprises a message that carries an extended Play and Collect sub-event package of a Basic Audio Unit (BAU) event package.

15. The system according to claim 14, wherein the extended Play and Collect sub-event package comprises parameters including Initial Prompt (ip), Non Interruptible Play (ni), Digit Map (dm) indicating valid key values, Iterations (it) and Interval (iv).

16. The system according to claim 9, further comprising:
a softswitch in communication with the AS and the calling and called parties.

17. An application service for replicating a ring back tones (RBT), comprising:

a component configure to receive a call to a called party initiated by a calling party;

send a Play and Collect request to an MRS; and receive the Replicate RBT request from the MRS;

send a Replicate RBT command to an RBT platform according to the received Replicate RBT request, the Replicate RBT command carrying RBT replication information and instructing the RBT platform to replicate the requested RBT to an information library of the calling party;

wherein the MRS is adapted to play an RBT subscribed by the called party to the calling party and obtain a Replicate RBT request initiated by the calling party according to the received Play and Collect request.

18. A media resource server (MRS) for replicating a ring back tones (RBT), comprising: a service processing unit and a play/collect unit, wherein the service processing unit is adapted for receiving the Play and Collect request from the AS, sending a control command to the play/collect unit according to the Play and Collect request, receiving the Replicate RBT request of the calling party returned by the play/collect unit and forwarding the Replicate RBT request to the AS; and wherein the play/collect unit is adapted for receiving the control command from the service processing unit and playing the requested RBT to the calling party according to the control command, obtaining the Replicate RBT request from the calling party, and forwarding the Replicate RBT request to the service processing unit.

* * * * *